United States Patent
Jain et al.

(10) Patent No.: US 11,513,604 B2
(45) Date of Patent: Nov. 29, 2022

(54) SELECTABLE RESPONSE OPTIONS DISPLAYED BASED-ON DEVICE GRIP POSITION

(71) Applicant: Motorola Mobility LLC, Chicago, IL (US)

(72) Inventors: Aman Jain, Panchkula (IN); Sukumar K Bhashyam, Bangalore (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/903,717

(22) Filed: Jun. 17, 2020

(65) Prior Publication Data
US 2021/0397264 A1    Dec. 23, 2021

(51) Int. Cl.
  *G06F 3/01* (2006.01)
  *H04W 68/00* (2009.01)
  *G06F 3/0482* (2013.01)
  *H04M 1/7243* (2021.01)

(52) U.S. Cl.
  CPC .......... *G06F 3/017* (2013.01); *G06F 3/0482* (2013.01); *H04M 1/7243* (2021.01); *H04W 68/005* (2013.01)

(58) Field of Classification Search
  None
  See application file for complete search history.

(56) References Cited

U.S. PATENT DOCUMENTS

| | | | |
|---|---|---|---|
| 8,493,342 B2 * | 7/2013 | Park | G06F 1/169 345/173 |
| 8,769,431 B1 * | 7/2014 | Prasad | G06F 3/048 715/788 |
| 8,924,894 B1 * | 12/2014 | Yaksick | G06F 3/0488 715/863 |
| 9,401,984 B1 | 7/2016 | Alameh et al. | |
| 9,851,883 B2 * | 12/2017 | Terrero | G06F 3/04847 |

(Continued)

OTHER PUBLICATIONS

"Final Office Action", U.S. Appl. No. 17/025,170, dated Dec. 7, 2021, 9 pages.

(Continued)

*Primary Examiner* — Hien L Duong
(74) *Attorney, Agent, or Firm* — FIG. 1 Patents

(57) ABSTRACT

In aspects of selectable response options displayed based-on device grip position, a wireless device has a display screen to display an incoming notification associated with a device application, and actionable responses are associated with the incoming notification. The wireless device implements a grip detection module to detect a device grip position of a user grip holding the wireless device. The wireless device also implements a notification control module to determine the actionable responses of the incoming notification. The notification control module can also initiate to display selectable response options corresponding to the actionable responses associated with the incoming notification, where the selectable response options are displayable along a display edge of the display screen proximate the device grip position. In implementations, the display screen includes a curved edge display region, and the selectable response options are displayable within the curved edge display region of the display screen.

20 Claims, 8 Drawing Sheets

(56) References Cited

U.S. PATENT DOCUMENTS

| | | | |
|---|---|---|---|
| 10,373,589 B2 | 8/2019 | Ota et al. | |
| 10,467,017 B2 | 11/2019 | Klein et al. | |
| 10,572,007 B2 | 2/2020 | Agarwal et al. | |
| 10,673,691 B2 | 6/2020 | Khosropour et al. | |
| 10,817,173 B2* | 10/2020 | DeBates | G06F 3/04817 |
| 10,831,318 B2 | 11/2020 | Liu et al. | |
| 10,936,011 B2 | 3/2021 | Yamada et al. | |
| 11,275,405 B2 | 3/2022 | Hotelling et al. | |
| 11,287,972 B1 | 3/2022 | Bower et al. | |
| 2005/0012723 A1 | 1/2005 | Pallakoff | |
| 2010/0117975 A1 | 5/2010 | Cho | |
| 2010/0299390 A1 | 11/2010 | Alameh et al. | |
| 2011/0082620 A1 | 4/2011 | Small et al. | |
| 2011/0117970 A1 | 5/2011 | Choi | |
| 2012/0032979 A1* | 2/2012 | Blow | G06F 1/1626 345/173 |
| 2012/0075351 A1 | 3/2012 | Imai et al. | |
| 2013/0038564 A1* | 2/2013 | Ho | G06F 3/0488 345/174 |
| 2013/0155095 A1 | 6/2013 | Hussain | |
| 2013/0159931 A1* | 6/2013 | Lee | G06F 1/1671 715/835 |
| 2013/0201155 A1 | 8/2013 | Wu et al. | |
| 2013/0222338 A1 | 8/2013 | Gim et al. | |
| 2013/0278552 A1 | 10/2013 | Kamin-Lyndgaard | |
| 2013/0324093 A1* | 12/2013 | Santamaria | H04M 1/724 455/414.1 |
| 2013/0342672 A1 | 12/2013 | Gray et al. | |
| 2014/0101545 A1 | 1/2014 | Paek et al. | |
| 2014/0051406 A1* | 2/2014 | Kim | H04W 4/16 455/414.1 |
| 2014/0108936 A1 | 4/2014 | Khosropour et al. | |
| 2014/0184519 A1 | 7/2014 | Benchenaa et al. | |
| 2014/0229848 A1 | 8/2014 | Zhang et al. | |
| 2015/0121215 A1 | 4/2015 | Wohlert et al. | |
| 2015/0229749 A1 | 8/2015 | Cho et al. | |
| 2015/0261376 A1 | 9/2015 | Kim et al. | |
| 2015/0363086 A1 | 12/2015 | Uno | |
| 2016/0062515 A1 | 3/2016 | Bae et al. | |
| 2016/0077616 A1 | 3/2016 | Durojaiye et al. | |
| 2016/0110098 A1 | 4/2016 | Stewart et al. | |
| 2016/0291731 A1* | 10/2016 | Liu | G06F 1/1656 |
| 2016/0291764 A1 | 10/2016 | Herring et al. | |
| 2016/0313966 A1 | 10/2016 | Jeong et al. | |
| 2016/0320866 A1 | 11/2016 | Parham | |
| 2016/0320966 A1 | 11/2016 | Ryu et al. | |
| 2017/0011210 A1 | 1/2017 | Cheong et al. | |
| 2017/0032787 A1 | 2/2017 | Dayal | |
| 2017/0060398 A1 | 3/2017 | Rastogi | |
| 2017/0102872 A1 | 4/2017 | Kim et al. | |
| 2017/0192642 A1 | 7/2017 | Fishman et al. | |
| 2017/0212631 A1* | 7/2017 | Kim | G06F 3/04883 |
| 2017/0231148 A1 | 8/2017 | Miwa | |
| 2017/0366555 A1 | 12/2017 | Matus | |
| 2018/0061370 A1 | 3/2018 | Ota et al. | |
| 2018/0095653 A1 | 4/2018 | Hasek | |
| 2018/0181245 A1 | 6/2018 | Beck et al. | |
| 2018/0239482 A1* | 8/2018 | Hinckley | G06F 3/03545 |
| 2018/0242242 A1* | 8/2018 | Lee | G06F 1/1643 |
| 2018/0329605 A1 | 11/2018 | Venkateswararao | |
| 2019/0018461 A1* | 1/2019 | DeBates | G06F 1/1601 |
| 2019/0018588 A1* | 1/2019 | DeBates | G06F 3/04883 |
| 2019/0020760 A1* | 1/2019 | DeBates | H04M 3/42 |
| 2019/0038260 A1 | 2/2019 | Lee et al. | |
| 2019/0052744 A1* | 2/2019 | Jung | G06F 3/016 |
| 2019/0179487 A1 | 6/2019 | Kong et al. | |
| 2020/0201501 A1* | 6/2020 | Rho | G06F 1/1643 |
| 2020/0389691 A1 | 10/2020 | Yoshizawa et al. | |
| 2021/0385417 A1 | 12/2021 | Park et al. | |
| 2022/0035412 A1 | 2/2022 | Agrawal et al. | |
| 2022/0038572 A1 | 2/2022 | Agrawal et al. | |
| 2022/0066564 A1 | 3/2022 | Agrawal et al. | |
| 2022/0091737 A1 | 3/2022 | Bower et al. | |
| 2022/0093023 A1 | 3/2022 | Agrawal et al. | |

OTHER PUBLICATIONS

"Non-Final Office Action", U.S. Appl. No. 17/002,027, dated Nov. 23, 2021, 13 pages.

"Non-Final Office Action", U.S. Appl. No. 16/944,007, dated Nov. 9, 2021, 15 pages.

"Non-Final Office Action", U.S. Appl. No. 17/025,131, dated Dec. 7, 2021, 20 pages.

"Notice of Allowance", U.S. Appl. No. 17/025,170, dated Jan. 31, 2022, 10 pages.

Agrawal, Amit Kumar et al., "U.S. Application as Filed", U.S. Appl. No. 17/575,338, filed Jan. 13, 2022, 64 pages.

Bandameedipalli, Jyothsna et al., "U.S. Application as Filed", U.S. Appl. No. 17/575,356, filed Jan. 13, 2022, 63 pages.

Russell, Brandon, "Galaxy S21 features wireless support for Samsung DeX on PC", XDA Developers Blog [online][retrieved Jun. 8, 2021]. Retrieved from the Internet <https://www.xda-developers.com/galaxy-s21-wireless-support-samsung-dex-on-pc/>., Feb. 5, 2021, 7 pages.

"Non-Final Office Action", U.S. Appl. No. 17/025,170, dated Jun. 18, 2021, 10 pages.

"Non-Final Office Action", U.S. Appl. No. 16/944,037, dated Mar. 16, 2022, 11 pages.

"Non-Final Office Action", U.S. Appl. No. 17/575,338, dated May 11, 2022, 13 pages.

"Supplemental Notice of Allowability", U.S. Appl. No. 17/025,170, dated Mar. 3, 2022, 3 pages.

U.S. Appl. No. 16/944,007, "Advisory Action", U.S. Appl. No. 16/944,007, dated Aug. 8, 2022, 3 pages.

U.S. Appl. No. 16/944,007, "Final Office Action", U.S. Appl. No. 16/944,007, dated May 31, 2022, 17 pages.

U.S. Appl. No. 17/025,131, "Final Office Action", U.S. Appl. No. 17/025,131, dated Jun. 22, 2022, 25 pages.

U.S. Appl. No. 17/025,131, "Notice of Allowance", U.S. Appl. No. 17/025,131, dated Aug. 17, 2022, 10 pages.

U.S. Appl. No. 16/944,037, "Notice of Allowance", U.S. Appl. No. 16/944,037, dated Oct. 12, 2022, 5 pages.

U.S. Appl. No. 17/025,131, "Corrected Notice of Allowability", U.S. Appl. No. 17/025,131, dated Aug. 30, 2022, 2 pages.

U.S. Appl. No. 17/575,338, "Final Office Action", U.S. Appl. No. 17/575,338, dated Oct. 5, 2022, 12 pages.

U.S. Appl. No. 17/575,356, "Non-Final Office Action", U.S. Appl. No. 17/575,356, dated Oct. 5, 2022, 21 pages.

* cited by examiner

SELECTABLE RESPONSE OPTIONS DISPLAYED BASED-ON DEVICE GRIP POSITION

BACKGROUND

Devices such as smart devices, mobile devices (e.g., cellular phones, tablet devices, smartphones), consumer electronics, and the like can be implemented with various display screen configurations. For example, a smartphone may be implemented with a display screen that is flat and encompasses most of one side of the device. More recently, some mobile devices are designed with a curved display screen that wraps around all or part of the vertical sides of a device. Generally, a curved display screen has a curved edge display on both vertical sides of a device, and the curved edge displays can be used to display user interface content and other display screen content.

While the curved edges of a curved display screen generally enhances the aesthetics of a device, the curved edges introduce various design and usability challenges, particularly for user interface selectable controls that may be displayed within the curved edge display. For example, different users have different finger sizes and ways of holding a device, which leads to challenges optimizing device grip suppression and false touches on the curved edges of the display screen, such as when also providing touch functionality of user interface selectable controls that may be displayed within the curved edge display.

Additionally, many device users favor or are accustomed to one-handed operation of a touchscreen on a device, and a user can generally navigate content and make selections in user interfaces displayed on the display screen with the thumb of the hand that the user is using to hold the device. However, depending on the size of a user's hands, and particularly for taller and/or wider devices, one-handed operation may not be possible without adjusting or vertically changing the grip where the user is holding a device.

BRIEF DESCRIPTION OF THE DRAWINGS

Implementations of the techniques for selectable response options displayed based-on device grip position are described with reference to the following Figures. The same numbers may be used throughout to reference like features and components shown in the Figures.

DETAILED DESCRIPTION

Figure 1:
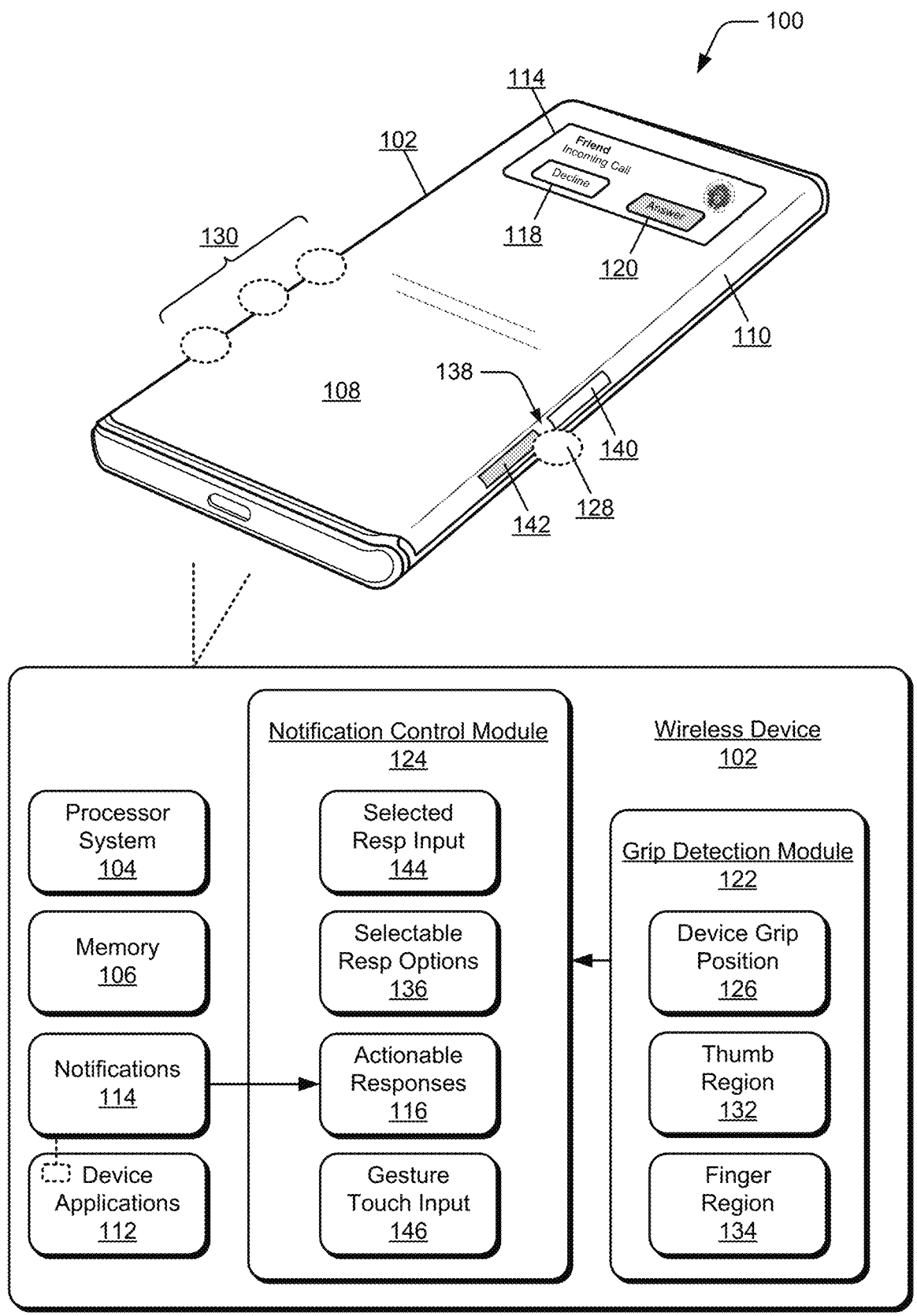
FIG. 1 illustrates an example of techniques for selectable response options displayed based-on device grip position using a wireless device in accordance with one or more implementations as described herein.

Implementations of selectable response options displayed based-on device grip position are described, and provide techniques that can be implemented by a wireless device to provide single-handed device operation without a user having to change his or her grip or way of holding the device. The described features provide that a user can manage and respond to incoming communications and notifications such as voice calls, video calls, alarms, text or email notifications, and the like without having to change hand location or reposition the device grip. Typically, many device users favor or are accustomed to one-handed operation of a touchscreen on a device, and a user can generally navigate content and make selections in user interfaces displayed on the display screen with the thumb of the hand that the user is using to hold the device. However, depending on the size of a user's hands, and particularly for taller and/or wider devices, one-handed operation may not be possible without adjusting or vertically changing the grip where the user is holding a device. For example, given an incoming notification displayed near the top of the display screen, the user may not be able to conveniently reach and interface with the notification without adjusting or changing their grip on the device.

In aspects of selectable response options displayed based-on device grip position, as described herein, a wireless device has a display screen that is a curved display, which wraps around all or part of the vertical sides of the wireless device. Generally, the display screen has curved edge display regions on both vertical sides of the device, and the curved edge display regions can be utilized to display any type of user interface or other display screen content. The wireless device can include many different types of device applications, many of which generate or have associated notifications, such as a notification that indicates an alarm, having received a text message or a new email message, or a notification of an incoming video call or phone call, which may be received and displayed on the display screen as a notification. A user of the device may then select the notification to activate or interface with a device application that is associated with the notification, such as to display the alarm interface, the text message, the new email message, or the cellular phone interface to accept an incoming call.

An incoming notification that is displayed on the display screen of the wireless device may be associated with one or more actionable responses that the user of the device can select to respond to the notification. For example, a notification of an incoming phone call might have two actionable responses associated with the notification, one to "Decline" the incoming phone call and one to "Answer" the incoming phone call. Other actionable response examples may be to "Snooze" or "Dismiss" an alarm notification that displays on the display screen of a wireless device. Notably, aspects of the described techniques expand beyond a binary response, and can include more than two actionable responses, such as for a text message notification that may be associated with possible responses of "Yes", "No", and "Maybe"; or "Yes", "No", and "What time?".

In aspects of the described selectable response options displayed based-on device grip position, the wireless device implements a grip detection module and a notification control module. The grip detection module can detect a device grip position of a user grip holding the wireless device. Typically, a user grips and holds a device with his or her thumb on one side, and two or three fingers on the other side of the device. The grip detection module can determine which hand, left or right, the user is using to hold the device, as well as the vertical position along the vertical sides of the device. The grip detection module can also determine a thumb region of the device grip position on a first side of the wireless device, such as proximate the location of the thumb of the user who is holding the device. Similarly, the grip detection module can also determine a finger region of the device grip position on a second side of the wireless device, such as proximate the finger positions of the user who is holding the device. In instances when a user changes hands and/or adjusts the grip position, the grip detection module can detect the change in the device grip position of the user grip holding the wireless device.

In other aspects, the notification control module can determine the actionable responses of an incoming notification, and then generate to display selectable response options that correspond to the actionable responses of the incoming notification. In implementations, the selectable response options are displayable along a display edge of the display screen proximate the device grip position so that the user of the device can easily reach and select one of the actionable responses without having to change the device grip position on the device. For example, the notification of the incoming phone call might have the two actionable responses associated with the notification, one to "Decline" the incoming phone call and one to "Answer" the incoming phone call. The notification control module can initiate to display, within the curved edge display region of the display screen, a selectable response option that corresponds to the "Decline" actionable response of the incoming notification, and a selectable response option that corresponds to the "Answer" actionable response of the incoming notification.

In other aspects, the notification control module can also uniquely identify the selectable response options to distinguish each of the actionable responses of an incoming notification. For example, the notification control module can uniquely identify the selectable response options with colors, markings, patterns, icons, numbers, borders, and/or any other type of distinguishing identifiers that map to the similar features of the actionable responses of a notification so as to differentiate and correlate the selectable response options with the respective actionable responses of the notification.

The selectable response options that are uniquely identified and displayed within the curved edge display region of the display screen are a secondary notification via which the user of the wireless device can respond to the incoming notification with one-handed operation, and without having to change his or her grip on the device. The selectable response options are displayed within the curved edge display region of the display screen proximate the determined thumb region, generally in the area of the thumb position of the user who is holding the device. Notably, the selectable response options are dynamically adjustable to display on either side of the wireless device within the curved edge display region of the display screen based on where and how the user grips and holds the device, such as based on the determined device grip position.

While features and concepts of selectable response options displayed based-on device grip position can be implemented in any number of different devices, systems, environments, and/or configurations, implementations of selectable response options displayed based-on device grip position are described in the context of the following example devices, systems, and methods.

FIG. 1 illustrates an example 100 of techniques for selectable response options displayed based-on device grip position, such as implemented with a wireless device 102. In this example 100, the wireless device 102 may be any type of a mobile phone, flip phone, computing device, tablet device, and/or any other type of mobile device. Generally, the wireless device 102 may be any type of an electronic, computing, and/or communication device implemented with various components, such as a processor system 104 and memory 106, as well as any number and combination of different components as further described with reference to the example device shown in FIG. 8. For example, the wireless device 102 can include a power source to power the device, such as a rechargeable battery and/or any other type of active or passive power source that may be implemented in an electronic, computing, and/or communication device.

The wireless device 102 includes a display screen 108, which in this example 100, is a curved display that wraps around, or partially wraps, the vertical sides of the wireless device. Generally, the display screen 108 has a curved edge display region 110 on both vertical sides of the wireless device, and the curved edge display regions can be utilized to display any type of user interface or other display screen content. The wireless device 102 also includes device applications 112, such as a text application, email application, video service application, cellular communication application, music application, and/or any other of the many possible types of device applications. Many device applications 112 generate or have associated notifications 114, such as a notification that indicates an alarm, having received a text message or a new email message, or a notification of an incoming video call or phone call, which may be received and displayed on the display screen 108 as a notification 114. A user of the device may then select the notification 114, such as with a touch input or some other type of trigger input to activate a device application 112 that is associated with the notification to then display the alarm interface, the text message, the new email message, or the cellular phone interface to accept the incoming call.

In this example 100, the display screen 108 of the wireless device 102 can display an incoming notification 114 that is associated with a device application 112, and the incoming notification 114 is associated with one or more actionable responses 116. For example, the incoming notification 114 displayed on the display screen 108 indicates an incoming phone call from a friend, and the notification includes two actionable responses, one to "Decline" 118 the incoming phone call and one to "Answer" 120 the incoming phone call. Other actionable response examples may be to "Snooze" or "Dismiss" an alarm notification that displays on the display screen 108 of the wireless device. Notably, aspects of the described techniques expand beyond a binary response, and a notification can be associated with more than two actionable responses 116, such as for a text message notification that may include possible responses of "Yes", "No", and "Maybe"; or "Yes", "No", and "What time?".

Alternatively, an incoming notification 114 that is displayed on the display screen 108 of the wireless device may have only one actionable response 116, in which case the user of the device can initiate to respond to the notification, or simply ignore the notification until it dismisses from the display automatically.

In this example 100, the wireless device 102 implements a grip detection module 122 and a notification control module 124, which can be implemented as separate modules that may include independent processing, memory, and/or logic components functioning as a computing and/or electronic device integrated with the wireless device 102. Alternatively or in addition, either of the modules can be implemented in software, in hardware, or as a combination of software and hardware components. In this example, the grip detection module 122 and the notification control module 124 are implemented as software applications or modules, such as executable software instructions (e.g., computer-executable instructions) that are executable with a processor (e.g., with the processor system 104) of the wireless device 102 to implement the techniques and features of selectable response options displayed based-on device grip position, as described herein.

As software applications or modules, the grip detection module 122 and the notification control module 124 can be stored on computer-readable storage memory (e.g., the memory 106 of the device), or in any other suitable memory device or electronic data storage implemented with the modules. Alternatively or in addition, the grip detection module 122 and/or the notification control module 124 may be implemented in firmware and/or at least partially in computer hardware. For example, at least part of the modules may be executable by a computer processor, and/or at least part of the modules may be implemented in logic circuitry.

The grip detection module 122 is implemented by the wireless device 102 to detect a device grip position 126 of a user grip holding the wireless device. A representation of a user grip holding the device is generally shown as a thumb position 128 on one vertical side of the wireless device, and finger positions 130 on the other vertical side of the device, as if a user were holding the device with his or her right hand. Typically, a user grips and holds a device with his or her thumb on one side, and two or three fingers on the other side of the device, which also likely contacts or rests in some portion of the user's palm of his or her hand.

The grip detection module 122 can determine which hand, left or right, the user is using to hold the device, as well as the vertical position along the vertical sides of the device. For example, the user may grip and hold the device with his or her right hand, vertically more towards the lower section or bottom of the device, as shown in this example 100. Notably, the grip detection module 122 can determine a thumb region 132 of the device grip position 126 on a first side of the wireless device, such as proximate the thumb position 128. The grip detection module 122 can also determine a finger region 134 of the device grip position 126 on a second side of the wireless device, such as proximate the finger positions 130. In instances when a user changes hands and/or adjusts the grip position, the grip detection module 122 can detect a change in the device grip position 126 of the user grip holding the wireless device.

Typically, many device users favor or are accustomed to one-handed operation of a touchscreen on a device, such as on the display screen 108 of the wireless device 102. A user can generally navigate content and make selections in user interfaces displayed on the display screen 108 with the thumb of the hand that the user is using to hold the device. However, as shown in this example 100, and particularly for taller and/or wider devices, one-handed operation may not be possible without adjusting or vertically changing the grip where the user is holding the device. For example, given the incoming notification 114 displayed near the top of the display screen 108, the user may not be able to conveniently reach and select one of the actionable responses 116, such as to "Decline" 118 or "Answer" 120 the incoming phone call.

In aspects of selectable response options displayed based-on device grip position, the notification control module 124 is implemented by the wireless device 102 to determine the one or more actionable responses 116 of an incoming notification 114. Generally, an operating system of the wireless device includes a notification manager, from which the content of the notification 114 can be extracted using notification access permissions to determine the actionable responses 116 of the notification. For example, the notification control module 124 can detect or be notified of the incoming notification 114, and subsequently determine the two actionable responses 116 to "Decline" 118 the incoming phone call or "Answer" 120 the incoming phone call.

The notification control module 124 can then generate to display selectable response options 136 that correspond to the one or more actionable responses 116 of the incoming notification 114. In implementations, the selectable response options 136 are displayable along a display edge of the display screen 108 proximate the device grip position 126, so that the user of the device can easily reach and select one of the actionable responses 116 without having to change the device grip position 126 on the device. In this example, the notification control module 124 initiates to display an action bar 138 within the curved edge display region 110 of the display screen 108. The action bar 138 includes a selectable response option 140 that corresponds to the "Decline" 118 actionable response of the incoming notification 114, and includes a selectable response option 142 that corresponds to the "Answer" 120 actionable response of the incoming notification.

The notification control module 124 is implemented to uniquely identify the selectable response options 136 to distinguish each of the one or more actionable responses 116 of the incoming notification 114. For example, the selectable response option 140 that corresponds to the "Decline" 118 actionable response of the incoming notification 114 is assigned or identified with a first color, whereas the selectable response option 142 that corresponds to the "Answer" 120 actionable response of the incoming notification is assigned or identified with a second color. In this example 100, the different levels of grayscale shading represent two different colors, such as red and green, or any other distinguishable colors used to differentiate the two selectable response options 136 that correlate to the actionable responses 116 of the incoming notification 114. In practice, the notification control module 124 can uniquely identify the selectable response options 136 with colors, markings, patterns, icons, numbers, borders, and/or any other type of distinguishing identifiers that map to the similar features of the actionable responses 116 so as to differentiate and correlate the selectable response options with the respective actionable responses of a notification.

In implementations, the action bar 138 that includes the two selectable response options 140, 142 can be displayed within the curved edge display region 110 of the display screen 108, and is a secondary notification via which the user of the wireless device can respond to the incoming notification 114 with one-handed operation, and without having to change his or her grip on the device. Generally, the action bar 138 is a secondary, localized notification for ease of user access and notification response. The notification control module 124 can generate and initiate to display the selectable response options 136 within the curved edge display region 110 of the display screen 108 proximate the determined thumb region 132, generally in the area of the thumb position 128 of the user who is holding the device. Notably, the action bar 138 is dynamically adjustable to display on either side of the wireless device 102 within the curved edge display region 110 of the display screen 108 based on where and how the user grips and holds the device, such as based on the determined device grip position 126.

Additionally, the notification control module 124 is configurable, such as by the user of the wireless device 102, to initiate the display of the selectable response options 136 proximate the determined thumb region 132 or proximate the determined finger region 134 within the curved edge display region 110 of the display screen 108. For example, the user of the wireless device 102 may prefer to access and respond to the incoming notification 114 using his or her index finger to easily reach and select one of the actionable responses 116, such as the selectable response option 140 that corresponds to the "Decline" 118 actionable response of the incoming notification 114, and the selectable response option 142 that corresponds to the "Answer" 120 actionable response of the incoming notification. Alternatively, the user may prefer to select the "Decline" 118 actionable response of the incoming notification 114 with his or her thumb of the hand being used to hold the device, and select the "Answer" 120 actionable response of the incoming notification with his or her index finger. Accordingly, the notification control module 124 is configurable to display the selectable response options 136, or part of the selectable response options, on both sides of the wireless device in the respective curved edge display regions 110 of the display screen 108.

The notification control module 124 can also receive a selected response input 144 as one of the selectable response options 136 corresponding to one of the actionable responses 116 of the incoming notification 114. For example, the user of the wireless device 102 may choose to decline answering the incoming phone call, and select the selectable response option 140 that corresponds to the "Decline" 118 actionable response of the incoming notification 114. Alternatively, the user of the wireless device 102 may want to answer the incoming phone call, and select the selectable response option 142 that corresponds to the "Answer" 120 actionable response of the incoming notification. In implementations, the selected response input 144 can then be communicated to the device application 112 that is associated with the incoming notification 114, and the device application can process the user selected response input.

In other aspects, the notification control module 124 may receive a gesture touch input 146, such as in the thumb region 132 of the device grip position 126. The gesture touch input 146 may be received as a user touch, slide, or swipe gesture initiated by the user of the wireless device 102 at or near the thumb position 128. The notification control module 124 can then initiate to display enhanced selectable response options that are expanded from the display edge of the display screen onto the display screen 108 for user selection. Generally, as further shown and described with reference to FIG. 4, a user of the wireless device 102 can touch or contact the thumb region 132 relative to the thumb position 128, and the selectable response options 136 slide out onto the display screen 108 for ease of user selection. This can be implemented to avoid false activation based on an inadvertent bump of the selectable response options 140, 142 in the curved edge display region 110 of the display screen 108, and provides a positive indication that the user intends to select one of the selectable response options.

Figure 2:
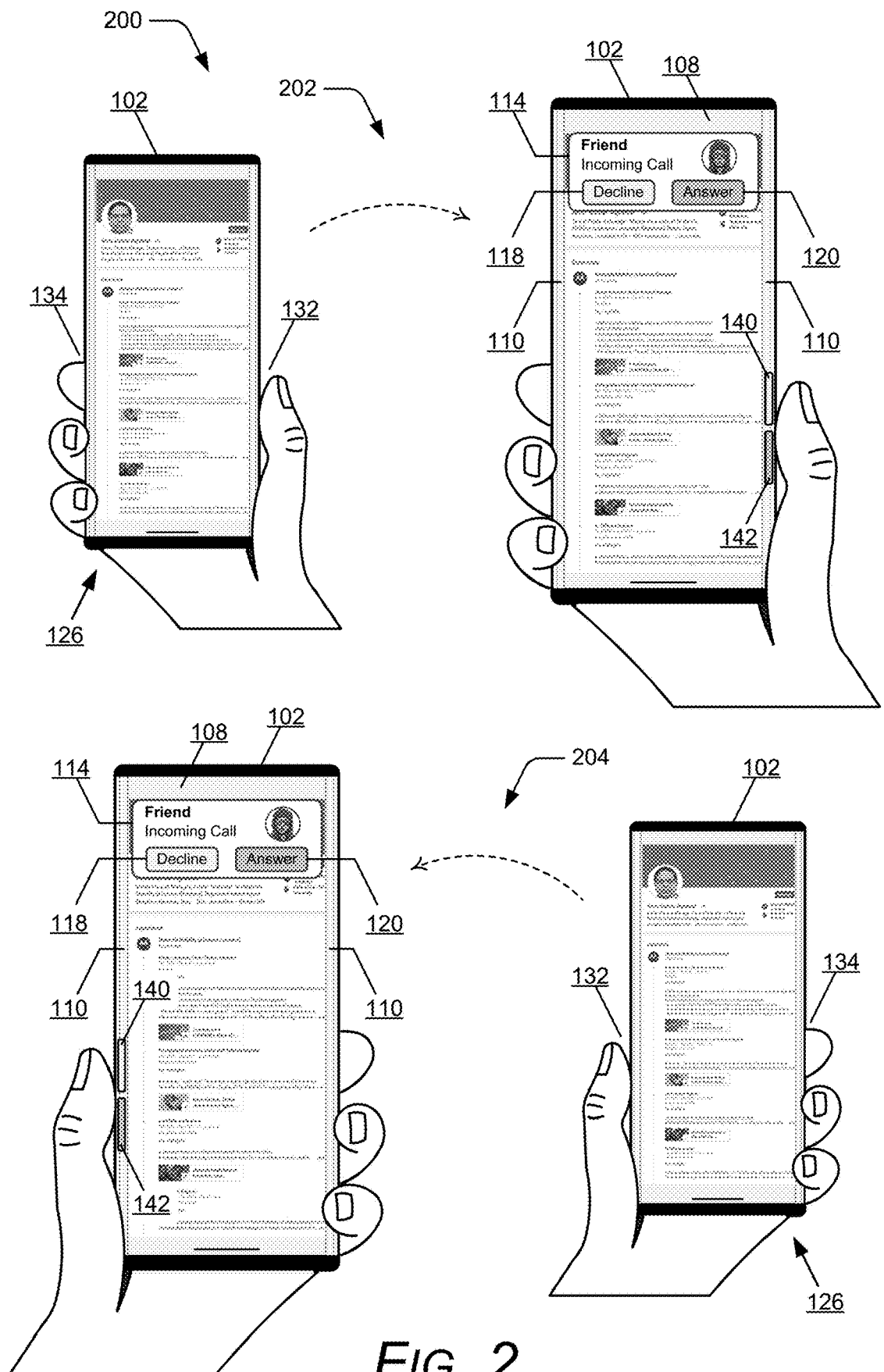
FIG. 2 illustrates examples of features for selectable response options displayed based-on device grip position using a wireless device in accordance with one or more implementations as described herein.

FIG. 2 illustrates examples 200 of aspects and features for selectable response options displayed based-on device grip position, as described herein, such as using the wireless device 102 as shown and described with reference to FIG. 1. As shown in an example 202, a user of the wireless device 102 may hold the device in his or her right hand. The grip detection module 122 that is implemented by the wireless device 102 can detect the device grip position 126 of the user grip holding the wireless device. The grip detection module 122 can determine the thumb region 132 of the device grip position 126 on a first side of the wireless device, and also determine the finger region 134 of the device grip position 126 on a second side of the wireless device.

The display screen 108 of the wireless device 102 can display the incoming notification 114 that is associated with a device application 112, and the notification 114 is associated with the actionable responses 116. For example, the notification 114 indicates an incoming phone call from a friend, and the notification includes two actionable responses, one to "Decline" 118 the incoming phone call and one to "Answer" 120 the incoming phone call. Given the detected device grip position 126 of the user grip holding the wireless device, and the incoming notification 114 displayed near the top of the display screen 108, the user is likely not able to conveniently reach and select one of the actionable responses, such as to "Decline" 118 or "Answer" 120 the incoming phone call with his or her thumb of the hand used to hold the device for one-handed operation.

The notification control module 124 that is implemented by the wireless device 102 can determine the actionable responses 116 that are associated with the incoming notification 114, such as the two actionable responses 116 to "Decline" 118 the incoming phone call or "Answer" 120 the incoming phone call. The notification control module 124 can then generate to display the selectable response options 136 that correspond to the actionable responses 116 of the incoming notification 114. For example, the notification control module 124 initiates to display the selectable response option 140 that corresponds to the "Decline" 118 actionable response of the incoming notification 114, and display the selectable response option 142 that corresponds to the "Answer" 120 actionable response of the incoming notification. Notably, the notification control module 124 can generate and initiate to display the selectable response options 136 within the curved edge display region 110 of the display screen 108 proximate the determined thumb region 132, generally in the area of the thumb position of the user who is holding the device.

As described above, the action bar 138 that includes the selectable response options 140, 142 is dynamically adjustable to display on either side of the wireless device 102 within the curved edge display region 110 of the display screen 108 based on where and how the user grips and holds the device, as determined by the grip detection module 122. An example 204 illustrates an instance of the user changing hands to hold the device in his or her left hand, and the grip detection module 122 can detect the change in the device grip position 126 of the user grip holding the wireless device. Accordingly, the notification control module 124 can change to display the selectable response option 140 that corresponds to the "Decline" 118 actionable response of the incoming notification 114, and display the selectable response option 142 that corresponds to the "Answer" 120 actionable response of the incoming notification within the curved edge display region 110 on the other side of the display screen 108.

Figure 3:
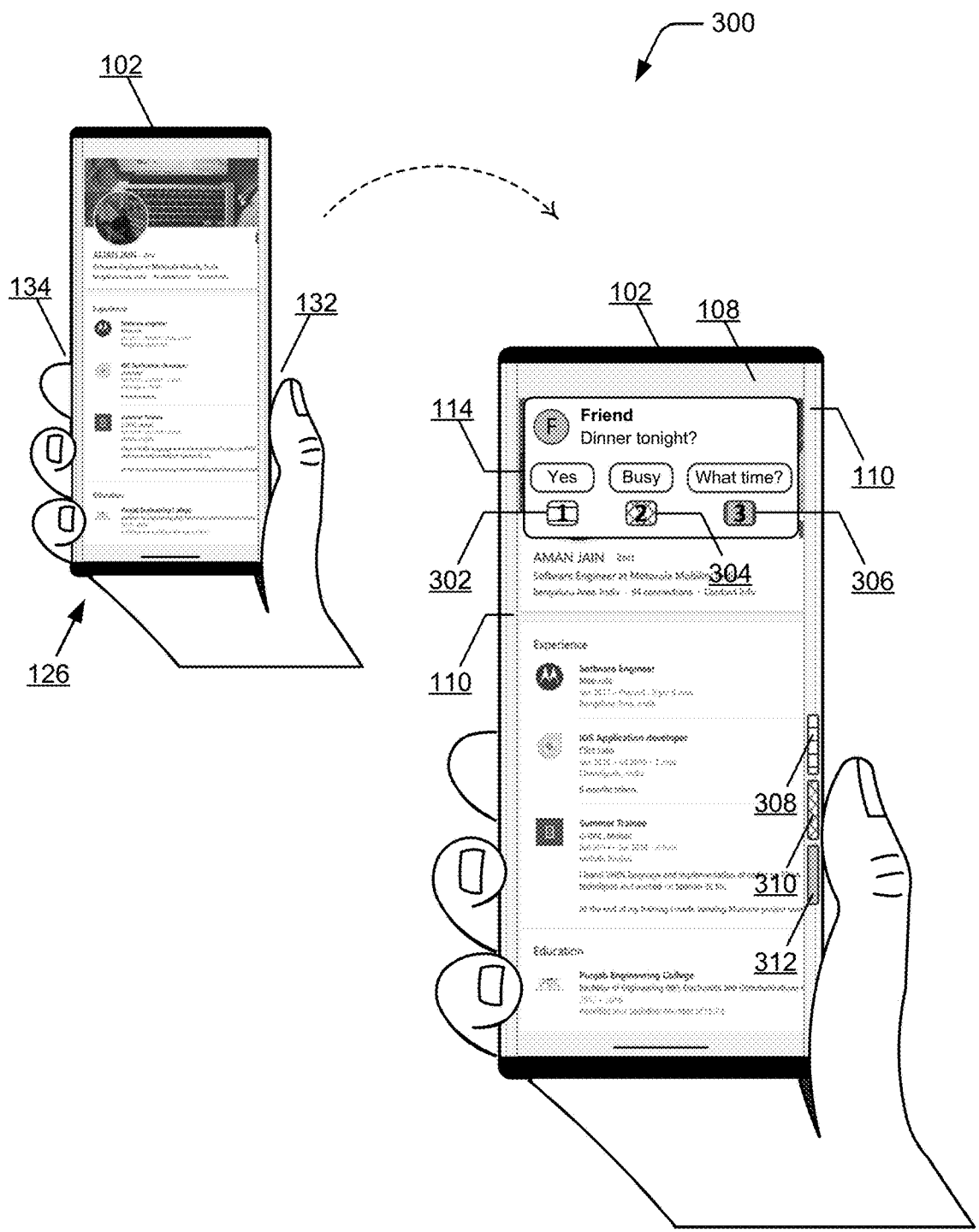
FIG. 3 illustrates another example of features for selectable response options displayed based-on device grip position using a wireless device in accordance with one or more implementations as described herein.

FIG. 3 illustrates an example 300 of features for selectable response options displayed based-on device grip position, as described herein, such as using the wireless device 102 as shown and described with reference to FIG. 1. In this example 300, the grip detection module 122 that is implemented by the wireless device 102 can detect the device grip position 126 of the user grip holding the wireless device. The grip detection module 122 can determine the thumb region 132 of the device grip position 126 on a first side of the wireless device, and also determine the finger region 134 of the device grip position 126 on a second side of the wireless device.

The display screen 108 of the wireless device 102 can display an incoming notification 114 that is associated with a device application 112, and the notification 114 is associated with actionable responses 116. In this example 300, the incoming notification 114 indicates a communication message from a friend inquiring about having dinner. As noted above, an incoming notification can include and/or be associated with more than two actionable responses 116, such as text message or other communication notification that may include multiple response options, such as "Yes", "Busy", and "What time?" in this example. The incoming notification 114 includes the three actionable responses, one to "Yes" 302 accept the dinner invitation, one to indicate "Busy" 304 and decline the dinner invitation, and one to reply "What time?" 306 for dinner.

The notification control module 124 that is implemented by the wireless device 102 can determine the actionable responses 116 of the incoming notification 114, and subsequently determine the three actionable responses 116 to accept, decline, or reply to the notification message. The notification control module 124 can then generate to display the selectable response options 136 that correspond to the actionable responses 116 of the incoming notification 114. For example, the notification control module 124 initiates to display a selectable response option 308 that corresponds to the "Yes" 302 actionable response of the incoming notification 114; display the selectable response option 310 that corresponds to the "Busy" 304 actionable response of the incoming notification; and display the selectable response option 312 that corresponds to the "What time?" 306 actionable response of the incoming notification. Notably, the notification control module 124 can generate and initiate to display the selectable response options 136 within the curved edge display region 110 of the display screen 108 proximate the determined thumb region 132, generally in the area of the thumb position of the user who is holding the device.

Figure 4:
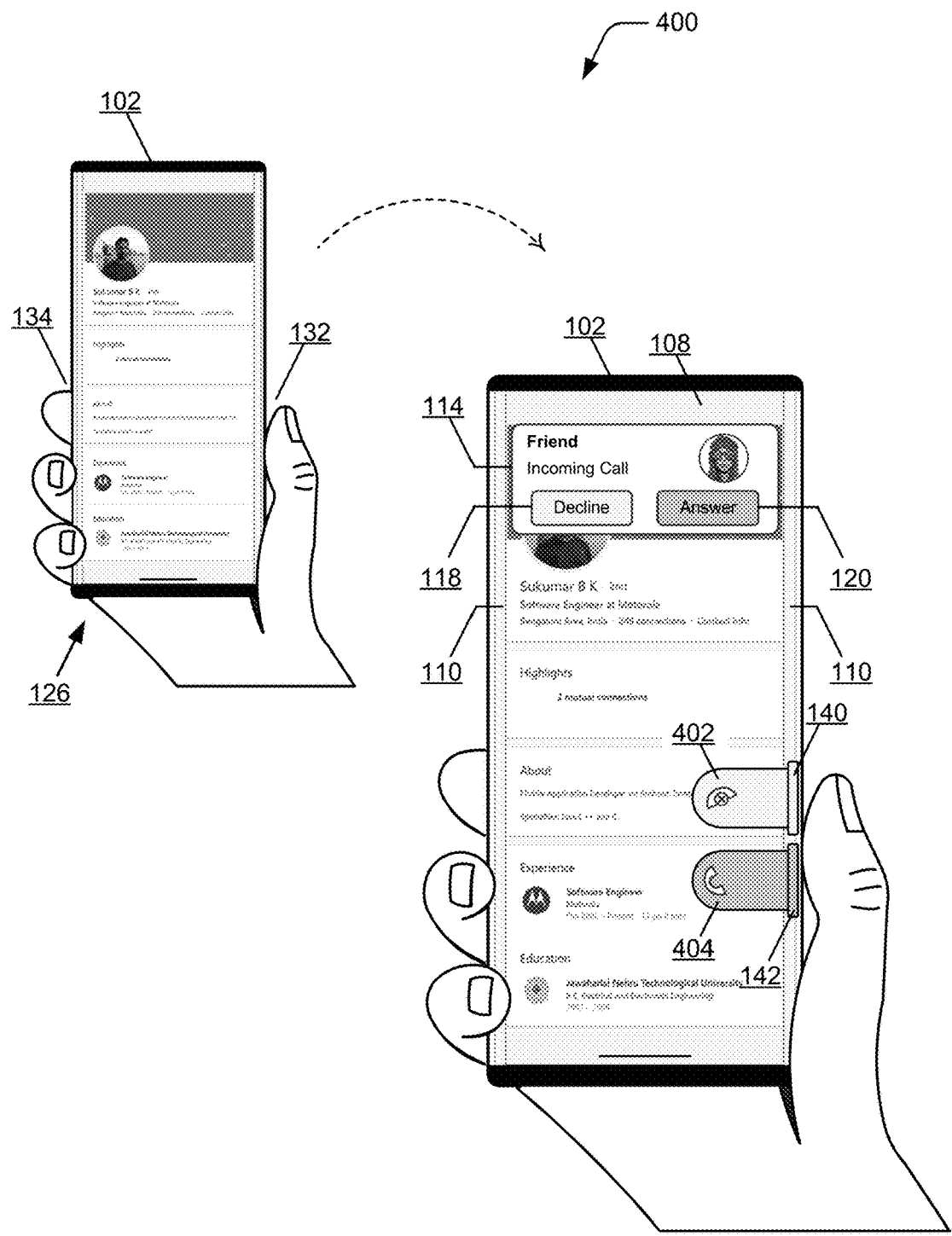
FIG. 4 illustrates another example of features for selectable response options displayed based-on device grip position using a wireless device in accordance with one or more implementations as described herein.

FIG. 4 illustrates an example 400 of features for selectable response options displayed based-on device grip position, as described herein, such as using the wireless device 102 that is shown and described with reference to FIG. 1. In this example 400, the grip detection module 122 that is implemented by the wireless device 102 can detect the device grip position 126 of the user grip holding the wireless device. The grip detection module 122 can determine the thumb region 132 of the device grip position 126 on a first side of the wireless device, and also determine the finger region 134 of the device grip position 126 on a second side of the wireless device.

As described with reference to FIG. 2, the display screen 108 of the wireless device 102 can display the incoming notification 114, such as to indicate an incoming phone call from a friend, and the notification is associated with the two actionable responses, one to "Decline" 118 the incoming phone call and one to "Answer" 120 the incoming phone call. The notification control module 124 that is implemented by the wireless device 102 can determine the actionable responses 116 of the incoming notification 114. The notification control module 124 can then generate to display the selectable response options 136 that correspond to the actionable responses 116 of the incoming notification 114.

For example, the notification control module 124 initiates to display the selectable response option 140 that corresponds to the "Decline" 118 actionable response of the incoming notification 114, and display the selectable response option 142 that corresponds to the "Answer" 120 actionable response of the incoming notification. Notably, the notification control module 124 can generate and initiate to display the selectable response options 136 within the curved edge display region 110 of the display screen 108 proximate the determined thumb region 132, generally in the area of the thumb position of the user who is holding the device.

In this example 400, the notification control module 124 can receive a gesture touch input 146, such as a user touch, slide, or swipe gesture initiated by the user in the thumb region 132 of the device grip position 126 of the user holding the wireless device 102. The notification control module 124 can then initiate to display enhanced selectable response options that are expanded from the display edge of the display screen onto the display screen 108 for user selection. For example, an enhanced selectable response option 402 that correlates with the selectable response option 140 is shown expanded from the curved edge display region 110 onto the display screen 108 for ease of user selection. Similarly, an enhanced selectable response option 404 that correlates with the selectable response option 142 is shown expanded from the curved edge display region 110 onto the display screen 108 for ease of user selection.

Generally, a user of the wireless device 102 can touch or contact the thumb region 132 relative to the location of the user's thumb position, and the selectable response options 136 slide out onto the display screen 108 for user selection. This can be implemented to avoid false activation based on an inadvertent bump of the selectable response options 140, 142 in the curved edge display region 110 of the display screen 108, and provides a positive indication that the user intends to select one of the selectable response options.

Figure 5:
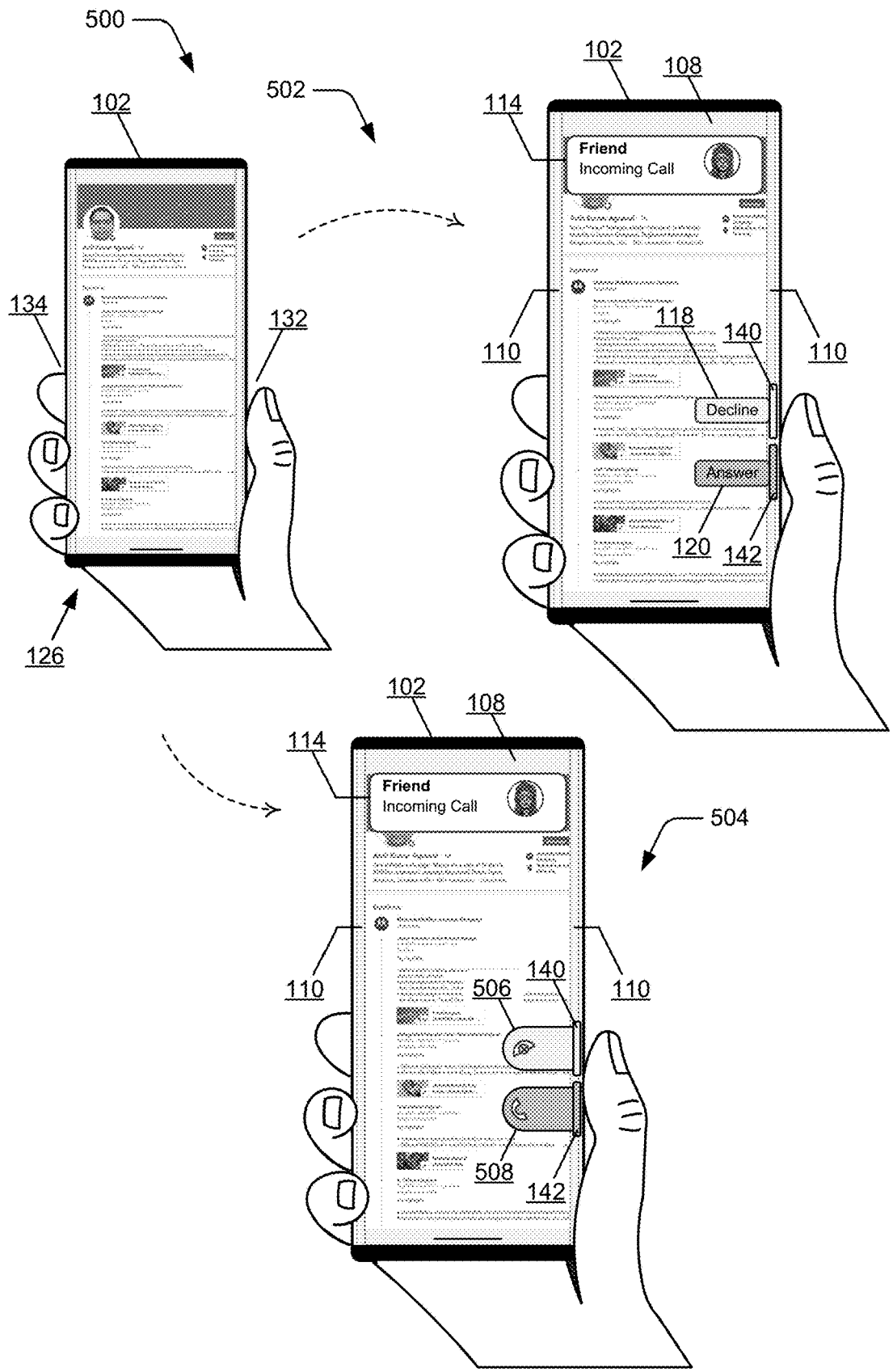
FIG. 5 further illustrates examples of features for selectable response options displayed based-on device grip position using a wireless device in accordance with one or more implementations as described herein.

FIG. 5 illustrates examples 500 of aspects and features for selectable response options displayed based-on device grip position, as described herein, such as using the wireless device 102 as shown and described with reference to FIG. 1. As shown in an example 502, a user of the wireless device 102 may hold the device in his or her right hand. The grip detection module 122 that is implemented by the wireless device 102 can detect the device grip position 126 of the user grip holding the wireless device. The grip detection module 122 can determine the thumb region 132 of the device grip position 126 on a first side of the wireless device, and also determine the finger region 134 of the device grip position 126 on a second side of the wireless device.

The display screen 108 of the wireless device 102 can display the incoming notification 114 that is associated with a device application 112, and the notification 114 is associated with actionable responses 116. However, in variation from the notifications shown in FIGS. 1-4, the notification 114 in this example 502 displays without the associated actionable responses, such as to "Decline" or "Answer" the incoming phone call. Rather, the actionable responses associated with the notification 114 may be displayed on or over the user interface proximate the selectable response options, such as to "Decline" 118 the incoming phone call and one to "Answer" 120 the incoming phone call. The notification control module 124 that is implemented by the wireless device 102 can determine the actionable responses 116 that are associated with the incoming notification 114, such as the two actionable responses 116 to "Decline" 118 the incoming phone call or "Answer" 120 the incoming phone call.

The notification control module 124 can then generate to display the selectable response options 136 that correspond to the actionable responses of the incoming notification 114. For example, the notification control module 124 initiates to display the selectable response option 140 that corresponds to the "Decline" 118 actionable response of the incoming notification 114, and display the selectable response option 142 that corresponds to the "Answer" 120 actionable response of the incoming notification. Notably, the notification control module 124 can generate and initiate to display the selectable response options 136 within the curved edge display region 110 of the display screen 108 proximate the determined thumb region 132, generally in the area of the thumb position of the user who is holding the device.

As described above, the action bar 138 that includes the selectable response options 140, 142 is dynamically adjustable to display on either side of the wireless device 102 within the curved edge display region 110 of the display screen 108 based on where and how the user grips and holds the device, as determined by the grip detection module 122. An example 504 further illustrates that the notification control module 124 can receive a gesture touch input 146, such as a user touch, slide, or swipe gesture initiated by the user in the thumb region 132 of the device grip position 126 of the user holding the wireless device 102. The notification control module 124 can then initiate to display enhanced selectable response options that are expanded from the display edge of the display screen onto the display screen 108 for user selection. For example, an enhanced selectable response option 506 that correlates with the selectable response option 140 is shown expanded from the curved edge display region 110 onto the display screen 108 for ease of user selection. Similarly, an enhanced selectable response option 508 that correlates with the selectable response option 142 is shown expanded from the curved edge display region 110 onto the display screen 108 for ease of user selection.

Generally, a user of the wireless device 102 can touch or contact the thumb region 132 relative to the location of the user's thumb position, and the selectable response options 136 slide out onto the display screen 108 for user selection. This can be implemented to avoid false activation based on an inadvertent bump of the selectable response options 140, 142 in the curved edge display region 110 of the display screen 108, and provides a positive indication that the user intends to select one of the selectable response options.

Example methods 600 and 700 are described with reference to respective FIGS. 6 and 7 in accordance with implementations of selectable response options displayed based-on device grip position. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
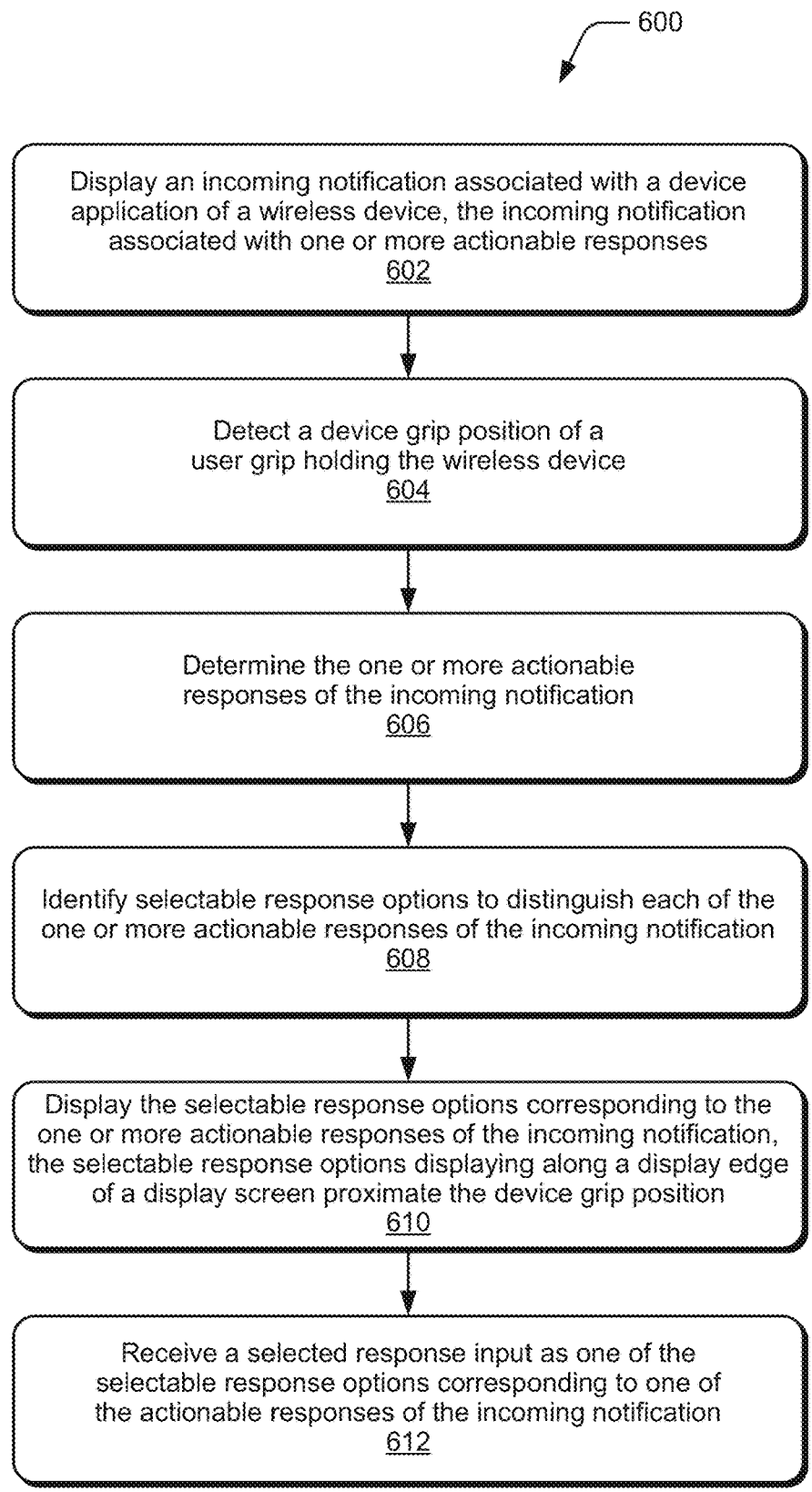
FIG. 6 illustrates example methods of selectable response options displayed based-on device grip position in accordance with one or more implementations of the techniques described herein.

FIG. 6 illustrates example method(s) 600 of selectable response options displayed based-on device grip position, and is generally described with reference to a wireless device, as well as a grip detection module and a notification control module implemented by the device. The order in which the method is described is not intended to be construed as a limitation, and any number or combination of the described method operations can be performed in any order to perform a method, or an alternate method.

At 602, an incoming notification associated with a device application of a wireless device is displayed, and the incoming notification is associated with one or more actionable responses. For example, the display screen 108 of the wireless device 102 includes the curved edge display regions 110 on both vertical sides of the device, and can display the incoming notification 114 that is associated with a device application 112. The incoming notification 114, indicating an incoming phone call from a friend, can include the actionable responses 116, and as shown in FIGS. 1 and 2, the notification includes two actionable responses, one to "Decline" 118 the incoming phone call and one to "Answer" 120 the incoming phone call. Alternatively, as shown and described with reference to FIG. 5, the incoming notification 114 itself may not display the one or more actionable responses that are associated with the incoming notification. Rather, the notification 114 shown in the example 502 displays without the associated actionable responses, such as to "Decline" or "Answer" the incoming phone call. Rather, the actionable responses associated with the notification 114 may be displayed on or over the user interface proximate the selectable response options, such as to "Decline" 118 the incoming phone call and one to "Answer" 120 the incoming phone call.

At 604, a device grip position of a user grip holding the wireless device is detected. For example, the grip detection module 122 implemented by the wireless device 102 can detect a device grip position 126 of a user grip holding the wireless device. Typically, a user grips and holds a device with his or her thumb on one side, and two or three fingers on the other side of the device, which also likely contacts or rests in some portion of the user's palm of his or her hand. The grip detection module 122 can determine which hand, left or right, the user is using to hold the device, as well as the vertical position along the vertical sides of the device. The grip detection module 122 can determine a thumb region 132 of the device grip position 126 on a first side of the wireless device, such as proximate the location of user's thumb position. The grip detection module can also determine a finger region 134 of the device grip position 126 on a second side of the wireless device, such as proximate the location of the user's finger positions. In instances when a user changes hands and/or adjusts the grip position, the grip detection module 122 can detect a change in the device grip position 126 of the user grip holding the wireless device.

At 606, the one or more actionable responses of the incoming notification are determined. For example, the notification control module 124 implemented by the wireless device 102 can determine the one or more actionable responses 116 of the incoming notification 114. Generally, an operating system of the wireless device includes a notification manager, from which the content of the notification 114 can be extracted using notification access permissions to determine the actionable responses 116 of the notification. For example, the notification control module 124 can detect or be notified of the incoming notification 114, and subsequently determine the two actionable responses 116 to "Decline" 118 the incoming phone call or "Answer" 120 the incoming phone call.

At 608, selectable response options are identified to distinguish each of the one or more actionable responses of the incoming notification. For example, the notification control module 124 implemented by the wireless device 102 can uniquely identify the selectable response options 136 to distinguish each of the one or more actionable responses 116 of the incoming notification 114, such as with colors, markings, patterns, icons, numbers, borders, and/or any other type of distinguishing identifiers that map to the similar features of the actionable responses 116 so as to differentiate and correlate the selectable response options with the respective actionable responses of a notification.

At 610, the selectable response options corresponding to the one or more actionable responses of the incoming notification are displayed, the selectable response options displaying along a display edge of a display screen proximate the device grip position. For example, the notification control module 124 implemented by the wireless device 102 can generate to display the selectable response options 136 that correspond to the one or more actionable responses 116 of the incoming notification 114. In implementations, the selectable response options 136 are displayable along a display edge of the display screen 108 proximate the device grip position 126, so that the user of the device can easily reach and select one of the actionable responses 116 without having to change the device grip position 126 on the device.

The notification control module 124 initiates to display the action bar 138 within the curved edge display region 110 of the display screen 108. The action bar 138 includes the selectable response option 140 that corresponds to the "Decline" 118 actionable response of the incoming notification 114, and includes the selectable response option 142 that corresponds to the "Answer" 120 actionable response of the incoming notification. The notification control module 124 can generate and initiate to display the selectable response options 136 within the curved edge display region 110 of the display screen 108 proximate the determined thumb region 132, generally in the area of the location or position of the thumb of the user who is holding the device. Alternatively, the notification control module 124 is configurable to display the selectable response options 136 proximate the finger region of the user who is holding the device, and within a curved edge display region 110 of the display screen.

At 612, a selected response input is received as one of the selectable response options corresponding to one of the actionable responses of the incoming notification. For example, the notification control module 124 can receive a selected response input 144 as one of the selectable response options 136 corresponding to one of the actionable responses 116 of the incoming notification 114. In implementations, the selected response input 144 can then be communicated to the device application 112 that is associated with the incoming notification 114, and the device application can process the user selected response input.

Figure 7:
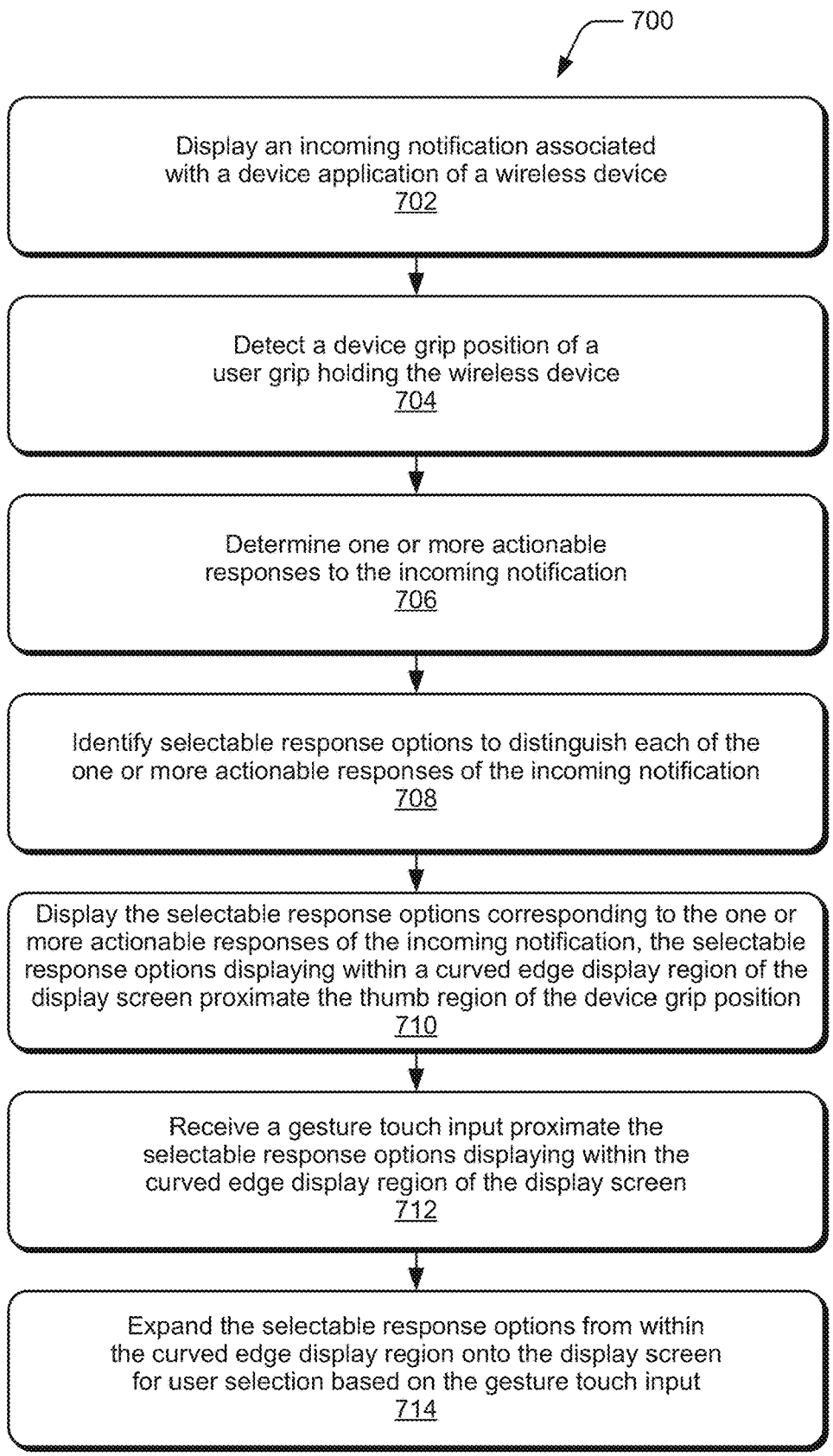
FIG. 7 illustrates example methods of selectable response options displayed based-on device grip position in accordance with one or more implementations of the techniques described herein.

FIG. 7 illustrates example method(s) 700 of selectable response options displayed based-on device grip position, and is generally described with reference to a wireless device, as well as a grip detection module and a notification control module implemented by the device. The order in which the method is described is not intended to be construed as a limitation, and any number or combination of the described method operations can be performed in any order to perform a method, or an alternate method.

At 702, an incoming notification associated with a device application of a wireless device is displayed. For example, the display screen 108 of the wireless device 102 includes the curved edge display regions 110 on both vertical sides of the device, and can display the incoming notification 114 that is associated with a device application 112. The incoming notification 114, indicating an incoming phone call from a friend, can include the actionable responses 116, and as shown in FIGS. 1 and 2, the notification includes two actionable responses, one to "Decline" 118 the incoming phone call and one to "Answer" 120 the incoming phone call. Alternatively, as shown and described with reference to FIG. 5, the incoming notification 114 itself may not display the one or more actionable responses that are associated with the incoming notification. Rather, the notification 114 shown in the example 502 displays without the associated actionable responses, such as to "Decline" or "Answer" the incoming phone call. Rather, the actionable responses associated with the notification 114 may be displayed on or over the user interface proximate the selectable response options, such as to "Decline" 118 the incoming phone call and one to "Answer" 120 the incoming phone call.

At 704, a device grip position of a user grip holding the wireless device is detected. For example, the grip detection module 122 implemented by the wireless device 102 can detect a device grip position 126 of a user grip holding the wireless device. Typically, a user grips and holds a device with his or her thumb on one side, and two or three fingers on the other side of the device, which also likely contacts or rests in some portion of the user's palm of his or her hand. The grip detection module 122 can determine which hand, left or right, the user is using to hold the device, as well as the vertical position along the vertical sides of the device. The grip detection module 122 can determine a thumb region 132 of the device grip position 126 on a first side of the wireless device, such as proximate the location of user's thumb position. The grip detection module can also determine a finger region 134 of the device grip position 126 on a second side of the wireless device, such as proximate the location of the user's finger positions. In instances when a user changes hands and/or adjusts the grip position, the grip detection module 122 can detect a change in the device grip position 126 of the user grip holding the wireless device.

At 706, one or more actionable responses to the incoming notification are determined. For example, the notification control module 124 implemented by the wireless device 102 can determine the one or more actionable responses 116 of the incoming notification 114. Generally, an operating system of the wireless device includes a notification manager, from which the content of the notification 114 can be extracted using notification access permissions to determine the actionable responses 116 of the notification. For example, the notification control module 124 can detect or be notified of the incoming notification 114, and subsequently determine the two actionable responses 116 to "Decline" 118 the incoming phone call or "Answer" 120 the incoming phone call.

At 708, selectable response options are identified to distinguish each of the one or more actionable responses of the incoming notification. For example, the notification control module 124 implemented by the wireless device 102 can uniquely identify the selectable response options 136 to distinguish each of the one or more actionable responses 116 of the incoming notification 114, such as with colors, markings, patterns, icons, numbers, borders, and/or any other type of distinguishing identifiers that map to the similar features of the actionable responses 116 so as to differentiate and correlate the selectable response options with the respective actionable responses of a notification.

At 710, the selectable response options corresponding to the one or more actionable responses of the incoming notification are displayed, the selectable response options displaying within a curved edge display region of the display screen proximate the thumb region of the device grip position. For example, the notification control module 124 implemented by the wireless device 102 can generate to display the selectable response options 136 that correspond to the one or more actionable responses 116 of the incoming notification 114. The notification control module 124 initiates to display the action bar 138 within the curved edge display region 110 of the display screen 108, and the action bar 138 includes the selectable response options 140, 142 that are displayed proximate the determined thumb region 132, generally in the area of the location or position of the thumb of the user who is holding the device.

At 712, a gesture touch input is received proximate the selectable response options displaying within the curved edge display region of the display screen, and at 714, the selectable response options are expanded from within the curved edge display region onto the display screen for user selection based on the gesture touch input. For example, the notification control module 124 can receive a gesture touch input 146, such as a user touch, slide, or swipe gesture initiated by the user in the thumb region 132 of the device grip position 126 of the user holding the wireless device 102. The notification control module 124 can then initiate to display enhanced selectable response options that are expanded from the display edge of the display screen onto the display screen 108 for user selection. This can be implemented to avoid false activation based on an inadvertent bump of the selectable response options 140, 142 in the curved edge display region 110 of the display screen 108, and provides a positive indication that the user intends to select one of the selectable response options.

Figure 8:
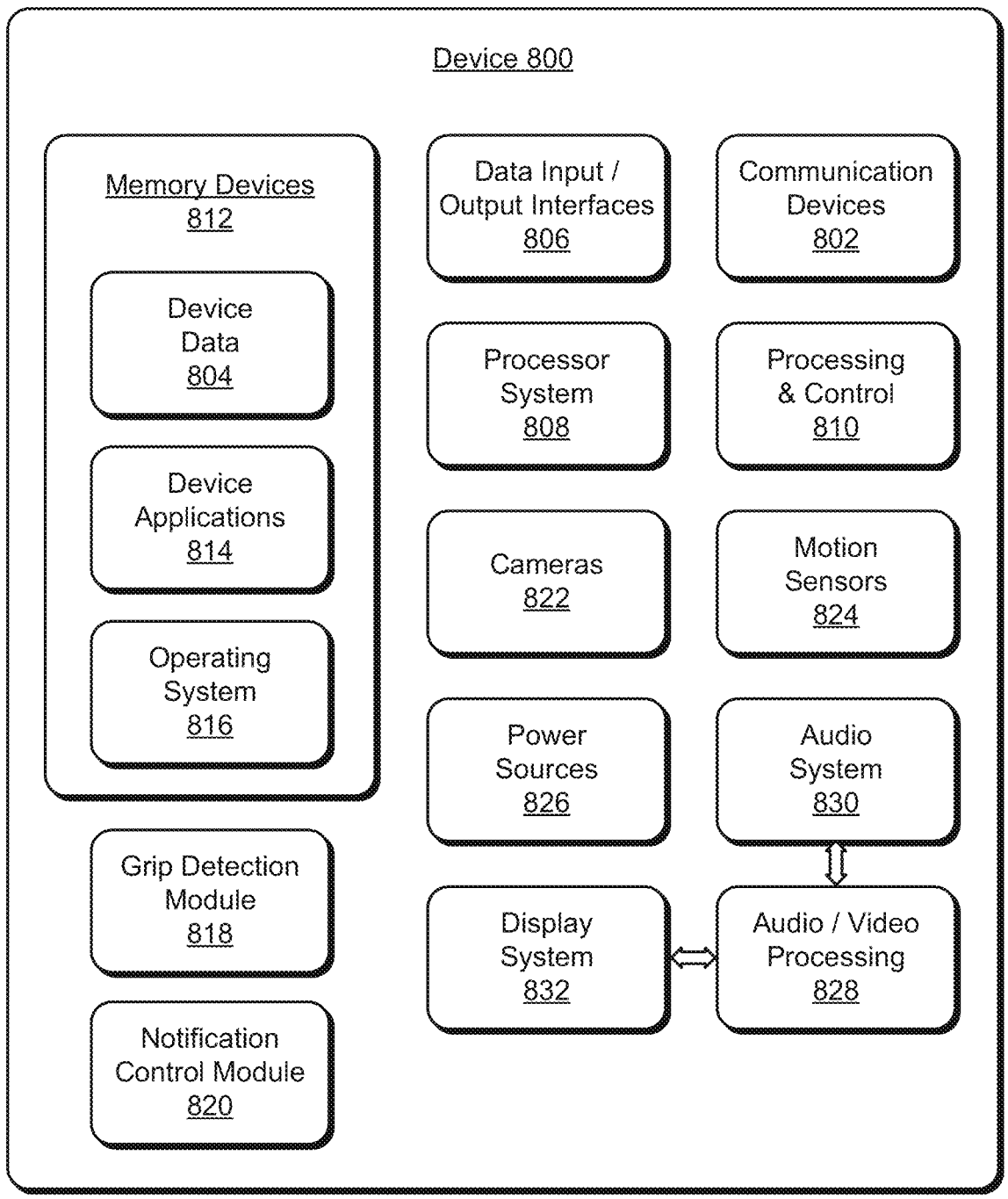
FIG. 8 illustrates various components of an example device that can be used to implement the techniques for selectable response options displayed based-on device grip position as described herein.

FIG. 8 illustrates various components of an example device 800, which can implement aspects of the techniques and features for selectable response options displayed based-on device grip position, as described herein. The example device 800 can be implemented as any of the devices described with reference to the previous FIGS. 1-7, such as any type of a wireless device, mobile device, mobile phone, flip phone, client device, companion device, paired device, display device, tablet, computing, communication, entertainment, gaming, media playback, and/or any other type of computing and/or electronic device. For example, the wireless device 102 described with reference to FIGS. 1-7 may be implemented as the example device 800.

The example device 800 can include various, different communication devices 802 that enable wired and/or wireless communication of device data 804 with other devices. The device data 804 can include any of the various devices data and content that is generated, processed, determined, received, stored, and/or transferred from one computing device to another, and/or synched between multiple computing devices. Generally, the device data 804 can include any form of audio, video, image, graphics, and/or electronic data that is generated by applications executing on a device. The communication devices 802 can also include transceivers for cellular phone communication and/or for any type of network data communication.

The example device 800 can also include various, different types of data input/output (I/O) interfaces 806, such as data network interfaces that provide connection and/or communication links between the devices, data networks, and other devices. The I/O interfaces 806 can be used to couple the device to any type of components, peripherals, and/or accessory devices, such as a computer input device that may be integrated with the example device 800. The I/O interfaces 806 may also include data input ports via which any type of data, information, media content, communications, messages, and/or inputs can be received, such as user inputs to the device, as well as any type of audio, video, image, graphics, and/or electronic data received from any content and/or data source.

The example device 800 includes a processor system 808 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 810. The example device 800 may also include any type of a system bus or other data and command transfer system that couples the various components within the device. A system bus can include any one or combination of different bus structures and architectures, as well as control and data lines.

The example device 800 also includes memory and/or memory devices 812 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 812 include volatile memory and non-volatile memory, fixed and removable media devices, and any suitable memory device or electronic data storage that maintains data for computing device access. The memory devices 812 can include various implementations of random-access memory (RAM), read-only memory (ROM), flash memory, and other types of storage media in various memory device configurations. The example device 800 may also include a mass storage media device.

The memory devices 812 (e.g., as computer-readable storage memory) provide data storage mechanisms, such as to store the device data 804, other types of information and/or electronic data, and various device applications 814 (e.g., software applications and/or modules). For example, an operating system 816 can be maintained as software instructions with a memory device and executed by the processor system 808 as a software application. The device applications 814 may also include a device manager, such as any form of a control application, software application, signal-processing and control module, code that is specific to a particular device, a hardware abstraction layer for a particular device, and so on.

In this example, the device 800 includes a grip detection module 818 and a notification control module 820 that implement various aspects of the described features and techniques for selectable response options displayed based-on device grip position. The modules may each be implemented with hardware components and/or in software as one of the device applications 814, such as when the example device 800 is implemented as the wireless device 102 described with reference to FIGS. 1-7. An example of the grip detection module 818 includes the grip detection module 122, and an example of the notification control module 820 includes the notification control module 124 that is implemented by the wireless device 102, such as software applications and/or as hardware components in the wireless device. In implementations, the grip detection module 818 and the notification control module 820 may include independent processing, memory, and logic components as a computing and/or electronic device integrated with the example device 800.

The example device 800 can also include cameras 822 and/or motion sensors 824, such as may be implemented as components of an inertial measurement unit (IMU). The motion sensors 824 can be implemented with various sensors, such as a gyroscope, an accelerometer, and/or other types of motion sensors to sense motion of the device. The motion sensors 824 can generate sensor data vectors having three-dimensional parameters (e.g., rotational vectors in x, y, and z-axis coordinates) indicating location, position, acceleration, rotational speed, and/or orientation of the device. The example device 800 can also include one or more power sources 826, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 800 can also include an audio and/or video processing system 828 that generates audio data for an audio system 830 and/or generates display data for a display system 832. The audio system and/or the display system may include any types of devices that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 800. Alternatively, the audio system and/or the display system are external, peripheral components to the example device.

Although implementations of selectable response options displayed based-on device grip position have been described in language specific to features and/or methods, the appended claims are not necessarily limited to the specific features or methods described. Rather, the specific features and methods are disclosed as example implementations of selectable response options displayed based-on device grip position, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A wireless device, comprising: a display screen to display an incoming notification associated with a device application; a grip detection module implemented at least partially in hardware to detect a device grip position of a user grip holding the wireless device; a notification control module implemented at least partially in the hardware to: determine one or more actionable responses of the incoming notification; and initiate to display selectable response options corresponding to the one or more actionable responses of the incoming notification, the selectable response options displayable along a display edge of the display screen proximate the device grip position.

Alternatively or in addition to the above described wireless device, any one or combination of: the display screen includes a curved edge display region; and the selectable response options corresponding to the one or more actionable responses of the incoming notification are displayable within the curved edge display region of the display screen. The notification control module is configured to uniquely identify the selectable response options to distinguish each of the one or more actionable responses of the incoming notification. The grip detection module is configured to determine a thumb region of the device grip position on a first side of the wireless device, and determine a finger region of the device grip position on a second side of the wireless device; and the notification control module is configured to initiate the display of the selectable response options proximate the thumb region within a curved edge display region of the display screen. The grip detection module is configured to determine a thumb region of the device grip position on a first side of the wireless device, and determine a finger region of the device grip position on a second side of the wireless device; and the notification control module is configurable to initiate the display of the selectable response options proximate the thumb region or proximate the finger region within a curved edge display region of the display screen. The grip detection module is configured to detect a change in the device grip position of the user grip holding the wireless device; and the notification control module is configured to initiate a change in display location of the selectable response options along the display edge of the display screen proximate the change in the device grip position. The notification control module is configured to receive a selected response input as one of the selectable response options corresponding to one of the actionable responses of the incoming notification. The grip detection module is configured to determine a thumb region of the device grip position proximate a side of the wireless device; the notification control module is configured to: receive a gesture touch input in the thumb region of the device grip position; initiate to display enhanced selectable response options that are expanded from the display edge of the display screen onto the display screen for user selection; and receive a selected response input as one of the enhanced selectable response options corresponding to one of the actionable responses of the incoming notification.

A method, comprising: displaying an incoming notification associated with a device application of a wireless device, the incoming notification associated with one or more actionable responses; detecting a device grip position of a user grip holding the wireless device; determining the one or more actionable responses of the incoming notification; and displaying selectable response options corresponding to the one or more actionable responses of the incoming notification, the selectable response options displaying along a display edge of a display screen proximate the device grip position.

Alternatively or in addition to the above described method, any one or combination of: the display screen includes a curved edge display region; and displaying the selectable response options corresponding to the one or more actionable responses of the incoming notification within the curved edge display region of the display screen. The method further comprising identifying the selectable response options to distinguish each of the one or more actionable responses of the incoming notification. The method further comprising determining a thumb region of the device grip position on a first side of the wireless device; determining a finger region of the device grip position on a second side of the wireless device; and displaying the selectable response options proximate the thumb region within a curved edge display region of the display screen. The method further comprising: determining a thumb region of the device grip position on a first side of the wireless device; determining a finger region of the device grip position on a second side of the wireless device; and receiving a configuration input to display the selectable response options proximate the thumb region or proximate the finger region within a curved edge display region of the display screen. The method further comprising: detecting a change in the device grip position of the user grip holding the wireless device; and changing a display location of the selectable response options along the display edge of the display screen proximate the change in the device grip position. The method further comprising receiving a selected response input as one of the selectable response options corresponding to one of the actionable responses of the incoming notification. The method further comprising: determining a thumb region of the device grip position proximate a side of the wireless device; receiving a gesture touch input in the thumb region of the device grip position; displaying expanded selectable response options that are expanded from the display edge of the display screen onto the display screen for user selection; and receiving a selected response input as one of the enhanced selectable response options corresponding to one of the actionable responses of the incoming notification.

A method, comprising: displaying an incoming notification associated with a device application of a wireless device; determining one or more actionable responses to the incoming notification; displaying selectable response options corresponding to the one or more actionable responses of the incoming notification, the selectable response options displaying within a curved edge display region of the display screen; receiving a gesture touch input proximate the selectable response options displaying within the curved edge display region of the display screen; and expanding the selectable response options from within the curved edge display region onto the display screen for user selection based on the gesture touch input.

Alternatively or in addition to the above described method, any one or combination of: the method further comprising identifying the selectable response options to distinguish each of the one or more actionable responses of the incoming notification. The further comprising: detecting a device grip position of a user grip holding the wireless device; determining a thumb region of the device grip position proximate a first side of the wireless device; and determining a finger region of the device grip position proximate a second side of the wireless device. The method further comprising displaying the selectable response options corresponding to the one or more actionable responses of the incoming notification within the curved edge display region of the display screen proximate the thumb region of the device grip position.

The invention claimed is:

1. A wireless device, comprising:
   a display screen to display an incoming notification associated with a device application, the incoming notification including a display of one or more actionable responses to the incoming notification;
   a grip detection module implemented at least partially in hardware to detect a device grip position of a user grip holding the wireless device; and
   a notification control module implemented at least partially in the hardware to:
     determine the one or more actionable responses of the incoming notification and selectable response options that each correspond to one of the one or more actionable responses; and
     initiate to display the selectable response options corresponding to the one or more actionable responses of the incoming notification based on the determine the one or more actionable responses and the selectable response options, the selectable response options displayed separate from the display of the incoming notification and from the one or more actionable responses, and the selectable response options displayable along a display edge of the display screen proximate the device grip position.

2. The wireless device of claim 1, wherein:
   the display screen includes a curved edge display region; and
   the selectable response options corresponding to the one or more actionable responses of the incoming notification are displayable within the curved edge display region of the display screen.

3. The wireless device of claim 1, wherein the notification control module is configured to uniquely identify the selectable response options to distinguish each of the one or more actionable responses of the incoming notification.

4. The wireless device of claim 1, wherein:
   the grip detection module is configured to determine a thumb region of the device grip position on a first side of the wireless device, and determine a finger region of the device grip position on a second side of the wireless device; and
   the notification control module is configured to initiate the display of the selectable response options proximate the thumb region within a curved edge display region of the display screen.

5. The wireless device of claim 1, wherein:
   the grip detection module is configured to determine a thumb region of the device grip position on a first side of the wireless device, and determine a finger region of the device grip position on a second side of the wireless device; and
   the notification control module is configurable to initiate the display of the selectable response options proximate the thumb region or proximate the finger region within a curved edge display region of the display screen.

6. The wireless device of claim 1, wherein:
   the grip detection module is configured to detect a change in the device grip position of the user grip holding the wireless device; and
   the notification control module is configured to initiate a change in display location of the selectable response options along the display edge of the display screen proximate the change in the device grip position.

7. The wireless device of claim 1, wherein the notification control module is configured to receive a selected response input as one of the selectable response options corresponding to one of the one or more actionable responses of the incoming notification.

8. The wireless device of claim 1, wherein:
the grip detection module is configured to determine a thumb region of the device grip position proximate a side of the wireless device;
the display screen is curved with a curved edge display; and
the notification control module is configured to:
receive a gesture touch input in the thumb region of the device grip position;
initiate to display enhanced selectable response options that are expanded from the curved edge display of the display screen onto the display screen for user selection; and
receive a selected response input as one of the enhanced selectable response options corresponding to one of the one or more actionable responses of the incoming notification.

9. A method, comprising:
displaying an incoming notification associated with a device application of a wireless device, the incoming notification including a display of one or more actionable responses to the incoming notification;
detecting a device grip position of a user grip holding the wireless device;
determining the one or more actionable responses of the incoming notification and selectable response options that each correspond to one of the one or more actionable responses; and
displaying the selectable response options corresponding to the one or more actionable responses of the incoming notification based on the determining the one or more actionable responses and the selectable response options, the selectable response options displayed separate from the incoming notification and from the one or more actionable responses, and the selectable response options displaying along a display edge of a display screen proximate the device grip position.

10. The method of claim 9, wherein:
the display screen includes a curved edge display region; and
displaying the selectable response options corresponding to the one or more actionable responses of the incoming notification within the curved edge display region of the display screen.

11. The method of claim 9, further comprising:
identifying the selectable response options to distinguish each of the one or more actionable responses of the incoming notification.

12. The method of claim 9, further comprising:
determining a thumb region of the device grip position on a first side of the wireless device;
determining a finger region of the device grip position on a second side of the wireless device; and
displaying the selectable response options proximate the thumb region within a curved edge display region of the display screen.

13. The method of claim 9, further comprising:
determining a thumb region of the device grip position on a first side of the wireless device;
determining a finger region of the device grip position on a second side of the wireless device; and
receiving a configuration input to display the selectable response options proximate the thumb region or proximate the finger region within a curved edge display region of the display screen.

14. The method of claim 9, further comprising:
detecting a change in the device grip position of the user grip holding the wireless device; and
changing a display location of the selectable response options along the display edge of the display screen proximate the change in the device grip position.

15. The method of claim 9, further comprising:
receiving a selected response input as one of the selectable response options corresponding to one of the one or more actionable responses of the incoming notification.

16. The method of claim 9, further comprising:
determining a thumb region of the device grip position proximate a side of the wireless device;
receiving a gesture touch input in the thumb region of the device grip position;
displaying expanded selectable response options that are expanded from the display edge of the display screen onto the display screen for user selection; and
receiving a selected response input as one of the selectable response options corresponding to one of the one or more actionable responses of the incoming notification.

17. A method, comprising:
displaying an incoming notification associated with a device application of a wireless device, the incoming notification including a display of one or more actionable responses to the incoming notification;
determining the one or more actionable responses to the incoming notification and selectable response options that each correspond to one of the one or more actionable responses;
displaying the selectable response options corresponding to the one or more actionable responses of the incoming notification based on the determining the one or more actionable responses and the selectable response options, the selectable response options displayed separate from the incoming notification and from the one or more actionable responses, and the selectable response options displaying within a curved edge display region of a display screen;
receiving a gesture touch input proximate the selectable response options displaying within the curved edge display region of the display screen; and
expanding the selectable response options from within the curved edge display region onto the display screen for user selection based on the gesture touch input.

18. The method of claim 17, further comprising:
identifying the selectable response options to distinguish each of the one or more actionable responses of the incoming notification.

19. The method of claim 17, further comprising:
detecting a device grip position of a user grip holding the wireless device;
determining a thumb region of the device grip position proximate a first side of the wireless device; and
determining a finger region of the device grip position proximate a second side of the wireless device.

20. The method of claim 19, further comprising:
displaying the selectable response options corresponding to the one or more actionable responses of the incoming notification within the curved edge display region of the display screen proximate the thumb region of the device grip position.

* * * * *